(12) United States Patent
Brooks (10) Patent No.: US 6,273,420 B1
(45) Date of Patent: Aug. 14, 2001

(54) ELECTRONIC MAZE GAME

(76) Inventor: Kenneth P. Brooks, 913 Grove St., Chapel Hill, NC (US) 27514

(*) Notice: Subject to any disclaimer, the term of this patent is extended or adjusted under 35 U.S.C. 154(b) by 0 days.

(21) Appl. No.: 09/352,636

(22) Filed: Jul. 13, 1999

(51) Int. Cl.[7] ................. A63F 13/00; A63F 3/00
(52) U.S. Cl. ................ 273/153 R; 273/109; 273/237; 273/258; 273/263; 463/9
(58) Field of Search ................. 273/153 R, 109, 273/258, 263, 175 R, 237–238, 243; 463/9

(56) References Cited

U.S. PATENT DOCUMENTS

| | | |
|---|---|---|
| 3,625,516 | * 12/1971 | Handweller ............... 273/153 R |
| 4,089,524 | 5/1978 | Hauck . |
| 4,103,895 | 8/1978 | Pressman et al. . |
| 4,240,638 | 12/1980 | Morrison et al. . |
| 4,288,537 | 9/1981 | Knetzger . |
| 4,323,242 | 4/1982 | Rosenfeld . |
| 4,326,719 | 4/1982 | Tran et al. . |
| 4,511,143 | 4/1985 | Sankrithi . |
| 4,674,753 | 6/1987 | Hochstim . |
| 4,850,592 | * 7/1989 | Winter ......................... 273/109 |
| 5,050,883 | 9/1991 | Goldfarb et al. . |

OTHER PUBLICATIONS

Internet, "www.billsgames.com/invisiblemaze/,".

* cited by examiner

Primary Examiner—Jessica J. Harrison
Assistant Examiner—Yveste G. Cherubin
(74) Attorney, Agent, or Firm—Olive & Olive, P.A.

(57) ABSTRACT

The maze game consists of a plurality of horizontal segments and a plurality of vertical segments that define a two-dimensional array of m×m squares or spaces where the size m is selectable by the user. In each potential segment location the present invention randomly locates: (1) a solid wall corresponding to a portion of the maze walls; (2) an opening creating a passage way through the maze; (3) special feature; or (4) the refuge, of which there is precisely one per maze. At the beginning of the game, the maze is invisible to all players. As the players move through the initially invisible maze, the maze walls adjacent each player's position become visible in a manner dictated by a particular vision setting selected at the beginning of the game. The goal of one player, who may be represented in the game as a cat, is to catch the other player, which may be represented in the game as a mouse, by occupying the mouse's location, i.e., by landing on the mouse. The mouse's object is to reach the refuge, or mousehole, which is located at a unique location within the maze, before being caught.

32 Claims, 11 Drawing Sheets

ELECTRONIC MAZE GAME

FIELD OF THE INVENTION

This invention relates to games and, in particular, to a computer generated maze game.

BACKGROUND OF THE INVENTION

Maze games are well known. Typically, maze games are comprised of a series of walls or barriers that form a labyrinth through which one or more players proceed to a particular goal. Players observe and evaluate the advantages and disadvantages of proceeding down alternative paths. Often players proceed down a pathway only to backtrack to avoid unforeseen dead-ends or other adverse consequences. Many maze games are embellished with hazards, clues, and other game devices that add visual appeal and depth to the game. Various electronic maze games are disclosed in U.S. Pat. Nos. 4,326,719, 4,323,342, 4,288,537, 4,103,895, 4,240,638, and 4,089,524.

SUMMARY OF THE INVENTION

The present invention provides a fast-action computer game for two players, a cat and a mouse. The invention is comprised of a computer program residing or otherwise integrated into a personal computer or on another interactive electronic processing device, having an input device such as a keyboard and a monitor. The hardware and software program of the invention are collectively referred to herein as the "system." In the preferred embodiment of the invention, the computer program of the invention randomly generates a maze, comprised of plurality vertical and horizontal running segments forming a two-dimensional array of squares, that is initially invisible to the players. Each segment is assigned a particular wall type: an open segment (passageway), a solid wall, one way, cat only, mouse only, teleport, randomizer, and mouse hole wall types. As the players move through the initially invisible maze, the maze walls adjacent each player's position become visible in a manner dictated by a particular vision setting selected by the player at the beginning of the game. The cat's object of the game is to catch the mouse by occupying the mouse's location, i.e., by landing on the mouse. The mouse's object is to reach the mouse hole, which is located at a unique location within the maze, before being caught.

DETAILED DESCRIPTION OF THE PREFERRED EMBODIMENT OF THE INVENTION

The maze of the invention consists of a plurality of horizontal segments and a plurality of vertical segments that define a two-dimensional array of m×m squares or spaces where the size m is selectable by the user. In each potential segment location the present invention randomly locates: (1) a solid wall corresponding to a portion of the maze walls; (2) an opening creating a passage way through the maze; (3) special feature; or (4) the mouse hole, of which there is precisely one per maze.

The segments do not occupy the squares; they lie between them so as to form borders between them. They are most conveniently represented by a three dimensional array of 2×m×(m−1) segment locations. The indices of the array will be referred to as follows:

d (direction) is either 0 or 1, indicating whether a horizontal or vertical segment is specified. Having chosen d, we now have a set of parallel segments to work with, all aligned in the same direction.

l (lengthwise) specifies the coordinate that lies "along the grain" of this set of segments.

w (widthwise) specifies the coordinate that lies across the grain.

Figure 1A:
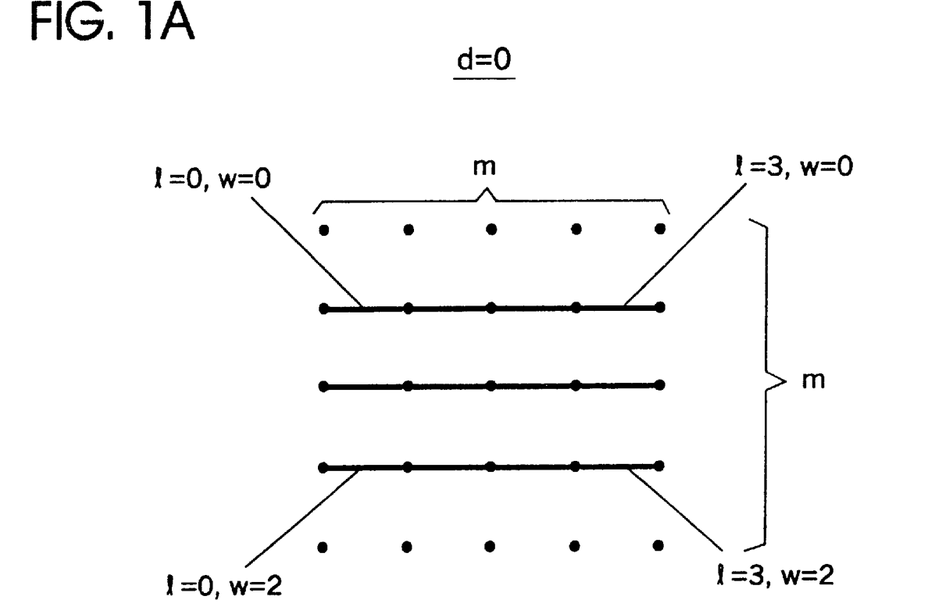
FIGS. 1A and 1B illustrate by way of example a small maze board with m=4, illustrating the coordination system used to address maze segments.
Figure 1B:
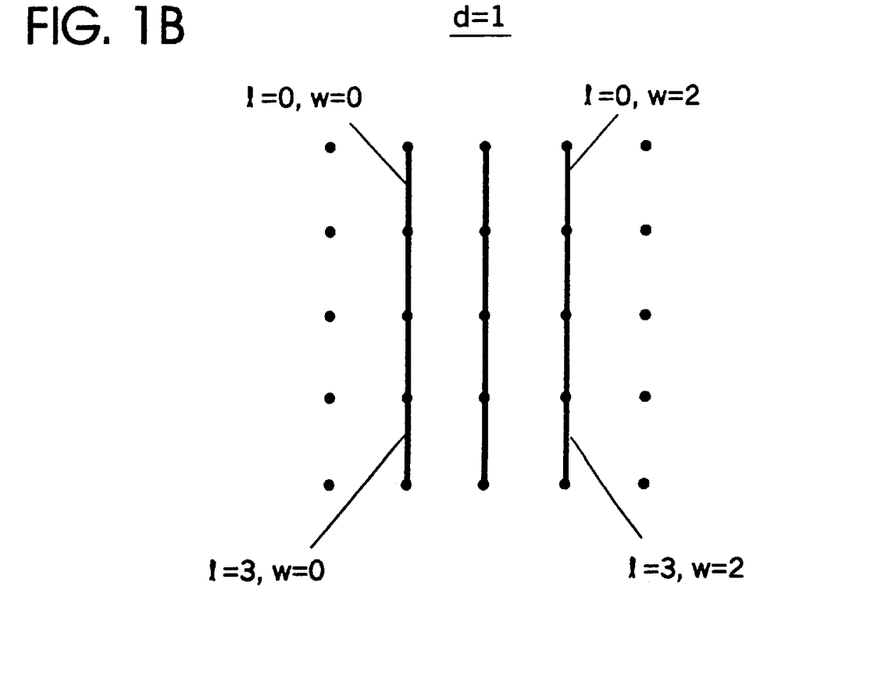

FIG. 1A illustrates by way of example a small maze board with m=4, and further illustrates the set of all segments with d=0, the use of l and w within it, and further illustrates by way of example several sample segments with their coordinates labeled l=0, w=0; l=3, w=0; and l=0, w=2; l=3, w=2. FIG. 1B shows the set of all segments with l=1, and the use of l and w within that set and illustrates by way of example the segments l=0, w=0; l=0, w=2; l=3, w=0; and l=1, w=2. Note that l and w refer to quite different positions in space in the two sets, and do not correspond to standard x and y coordinates. However, there is an easily computed correspondence between the (x, y) coordinates of a space in the maze, and a direction (up, down, right, left)

the (d, l, w) coordinates of the maze segment adjacent to that space in that direction.

This unique coordinate scheme of the present invention is not necessary to the basic effectiveness of the invention, but it proves convenient because it yields an array with consistent rectangular bounds, and it simplifies many of the computations the present invention requires.

Figure 2A:
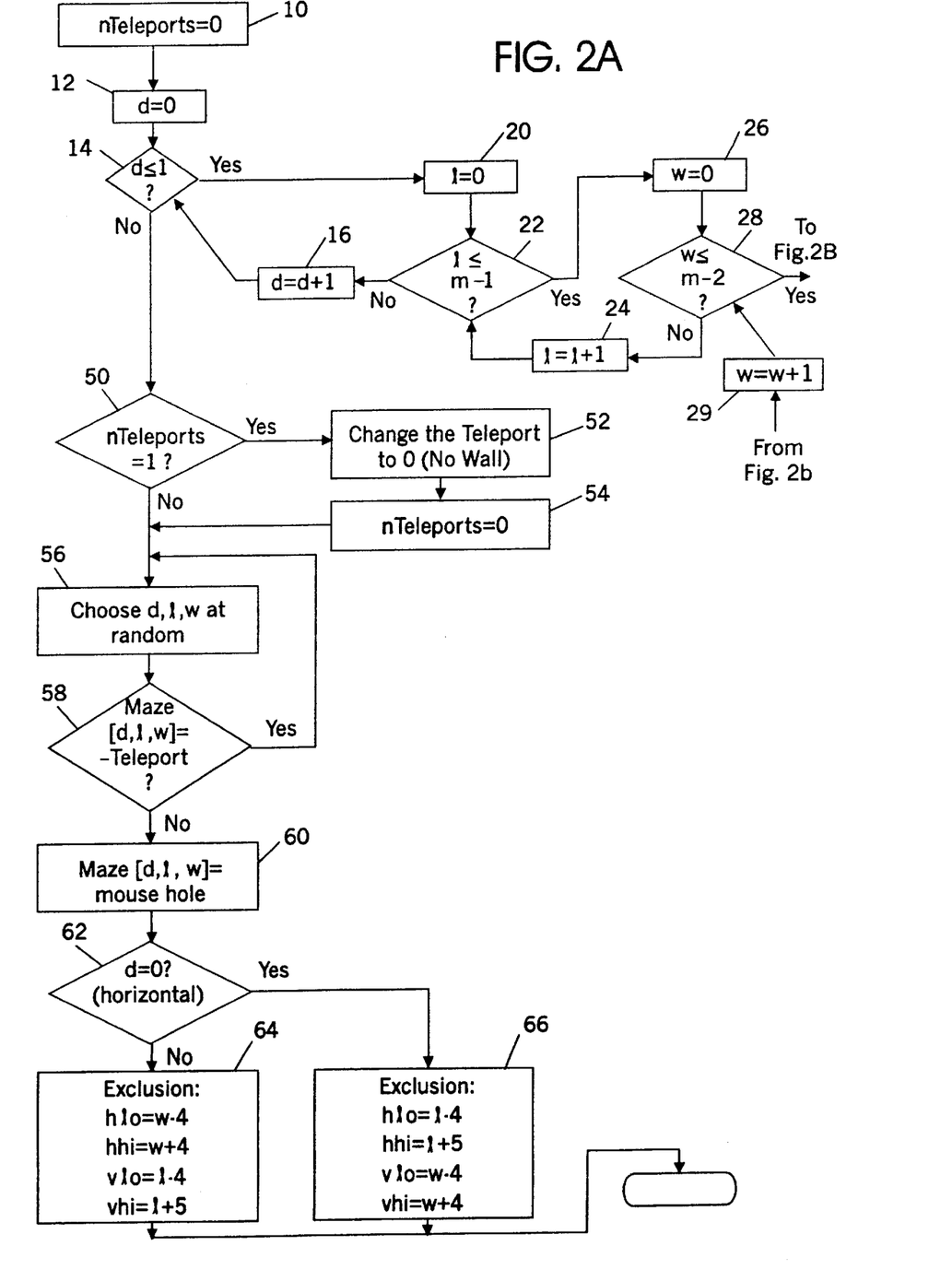
FIGS. 2A and 2B together represent a flow diagram illustrating the steps used to build the maze of the invention.
Figure 2B:
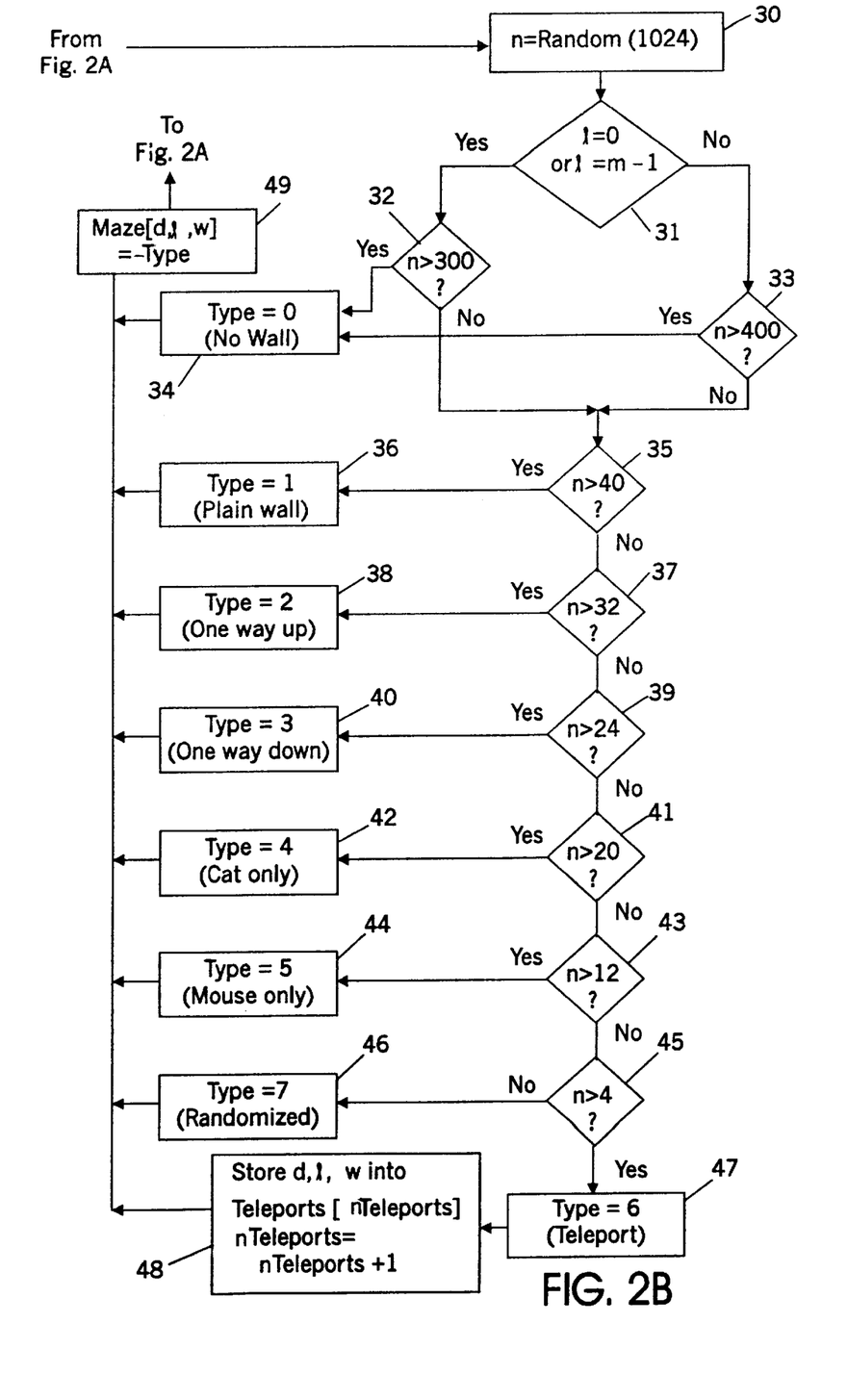

FIGS. 2A and 2B comprise a flow diagram illustrating the steps used to build the maze of a size selected by a player. The program of the invention as revealed in FIGS. 2A and 2B scans each segment position in turn and generates a random number used to assign a solid wall, open wall, mouse hole or one of numerous active features, to each segment position. Below is a list of definitions for terms used in the flow chart of FIGS. 2A and 2B:

m size of maze

Maze[d, l, w] holds wall type at each location

Teleports [] an array holding d, l, w coordinates for each teleport nTeleports number of active teleports d direction (0 or 1)

l lengthwise (0 . . . m−1)

w widthwise (0 . . . m−2)

T minimum time duration of each turn

Referring to FIGS. 2A and 2B, step 10 initializes nTeleports to 0, indicating that no teleports have yet been generated. Steps 12 through 29 represent the control logic for a three-level nested loop that processes all possible combinations of d, l, and w that are relevant for a maze of the current size m. More specifically, steps 12 through 16 describe a loop that takes place twice, once with d=0 and once with d=1. Within that loop, steps 20 through 24 describe a second loop that takes place m times for each iteration of the first loop, stepping through values of l from 0 to m−1. Within that loop, steps 26 through 29 describe a third loop that takes place m−1 times for each iteration of the second loop, stepping through values of w from 0 to m−2.

Referring to FIG. 2B, steps 30 through 49, representing the inner core of this nested loop, are executed once for each combination of d, l, and w, and they serve to randomly generate a segment type for that location and store it into the maze. Step 30 begins by generating a random integer, from 0 to 1023. This number, along with the probabilities programmed into the subsequent steps, will determine the segment type.

Maze spaces located next to the outer rim are exceptional; they have only three potential open segments next to them, instead of the usual four. If the probabilities for those three segments are left unmodified, the space as a whole has a greater probability of being entirely closed off; which, in fact, often happens. To counteract this effect, we increase the probability of generating an open segment, and correspondingly reduce the probability of generating a wall, for those segments that abut the outer rim. In step 31, these segments can be identified by their l coordinate: l=0 (first segment in its row) or l=m−1 (last in its row). Step 32, governs the probabilities for the segments located next to the outer rim; step 33 handles the normal case.

The majority of values of n produce an open segment. If the value is lower than the cutoff for an open segment, control proceeds to step 35. Steps 35 through 47 deal with the probabilities of each segment type: if n is >40, the segment will be a plain wall, if the random number n is >32 but <40, the segment will be a one way up; else if it is >24 but $\leq$32, the segment will be a one way down, etc., until at step 45; if n is $\leq$4 the segment will be a Randomizer.

At step 48, teleport segments get special treatment. If a teleport is generated, the coordinates d, l, w are stored in the teleport list (teleports), which links all randomly generated teleport locations together so that the teleport stations can find each other.

At last, at step 49, the generated segment type is stored into the maze, as a negative number, indicating that it is presently invisible. Segment type 0 (an open segment) is neither positive nor negative, and it is neither visible nor invisible: such segments are always displayed as blank.

Referring again to FIG. 2A, after the segment generation loop is complete there are a few cleaning-up actions to do; these start at step 50. It is not meaningful to have one teleport in the maze, since it would have no other station to transmit to. Hence in steps 50 through 54, if there is only one teleport, it is changed into an open segment and deleted from the teleport table.

Steps 56, 58 and 60 place the mousehole. Since there is one and only one mousehole, we do not give it a probability; instead, after all else has been built, we choose its location randomly, and overwrite whatever value that segment already had. However, it must not overwrite a teleport (whose location is already recorded in the teleport table) or the remaining teleports will transmit players to the mousehole—a most startling result! Hence, at step 58 the program catches this case, and tries again with new random coordinates.

Next, steps 62 through 66 define an exclusion rectangle around the mouse hole. The mouse will never be given a starting position within this rectangle, because it would be too great an advantage.

In accordance with the preferred embodiment of the present invention, the segments, except for the mousehole, are initially invisible. As the players move, segments nearest each player's position will become visible in a pattern that corresponds to one of the vision settings 0 , 1, 2, or 3 that the players select at the beginning of the game. Under vision setting 0 ("Blind"), the system displays only those invisible segments that a player actually collides with or interacts with. Thus, in vision setting 0, only one segment becomes visible at a time. Vision setting 1 ("Myopic") makes visible to the players the invisible segments that border the space occupied by a player in response to the player moving into that space. In addition to making visible the invisible segments immediately bordering the space occupied by the player, vision setting 2 ("Normal") also reveals segments bordering the spaces adjacent to the player, provided that nothing obstructs the line of sight from the center of the space occupied by such player. More precisely, wherever an open segment borders the player's position, the player can "see" into the adjacent space; however, a wall or any special feature would block the view. Vision setting 2 is the most complex; all other settings can be viewed as simplifications of the same method for computing vision. Vision setting 3 ("Total") reveals the entire maze from the beginning of the game.

Figure 3A:
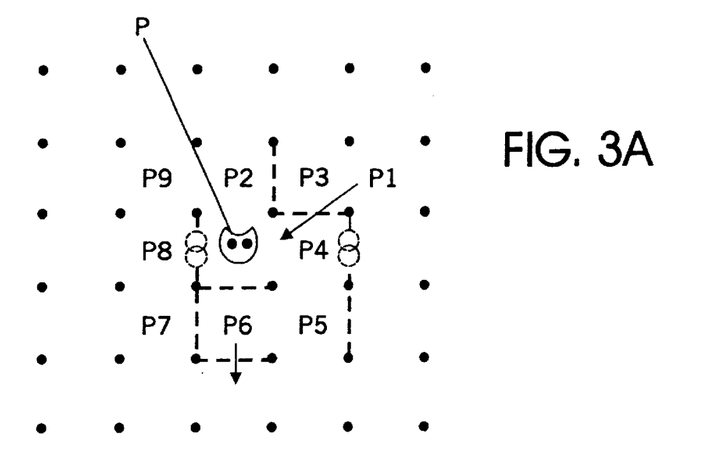
FIGS. 3A and 3B are diagrams of a two dimensional representation of the maze of the invention, showing a portion of a maze before (FIG. 2A) and after (FIG. 2B) the vision method of the invention has been executed in response to player moving into space P1.
Figure 3B:
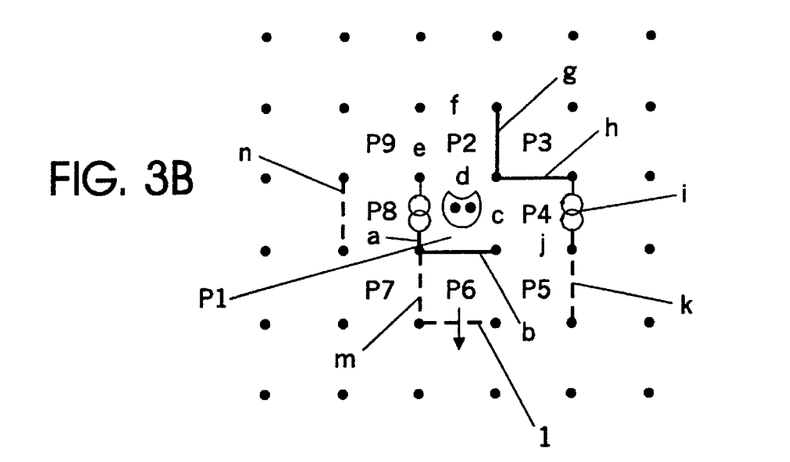

FIGS. 3A and 3B show a portion of the board, before and after the vision method for vision setting 2 has been applied. This takes place subsequent to the arrival of player P at space P1. For purposes of this illustration, we will assume that P arrived via Hyperspace or a Randomizer, so that he left no visible trail on the way to P1. Invisible features are shown as dashed lines in FIGS. 3A and 3B; in the actual playing of the game they would not be seen at all. Likewise, grid points, shown here as black dots for clarity, are not shown in the actual game. Thus, by way of example and in accordance with vision setting 2 of the invention, the teleport at a and at the solid wall at b appear, while segments c and d remain blank because they are actually open segments (segment types being previously and randomly assigned to the maze segments as discussed above). Since a player can see through open segments c and d, the features bordering positions P2 and P4, namely the solid walls at g and h and the teleport at i, also appear. Segments e, f and j remain blank because they are open segments. Segments l, m, and n, being hidden from view by segments a and b, remain invisible. Segment k remains invisible because it is out of range; only segments that are adjacent to P1, P2, P4, P6, or P8 could ever be visible from P1 in accordance with vision setting 2 of the invention.

Thus, using the vision 2 setting and as illustrated by FIGS. 3A and 3B, a player having a mouse, for example, occupying a particular space must look beyond the space's immediately adjacent segments or wall types to determine the best course of action. Vision setting 2 requires that each player discern between a larger set of alternative pathways, yet the invention still does not reveal, in response to a single move by either player, the entire or a large portion of the maze, thereby providing to players a challenging and exciting mix of strategy and surprise.

Figure 4A:
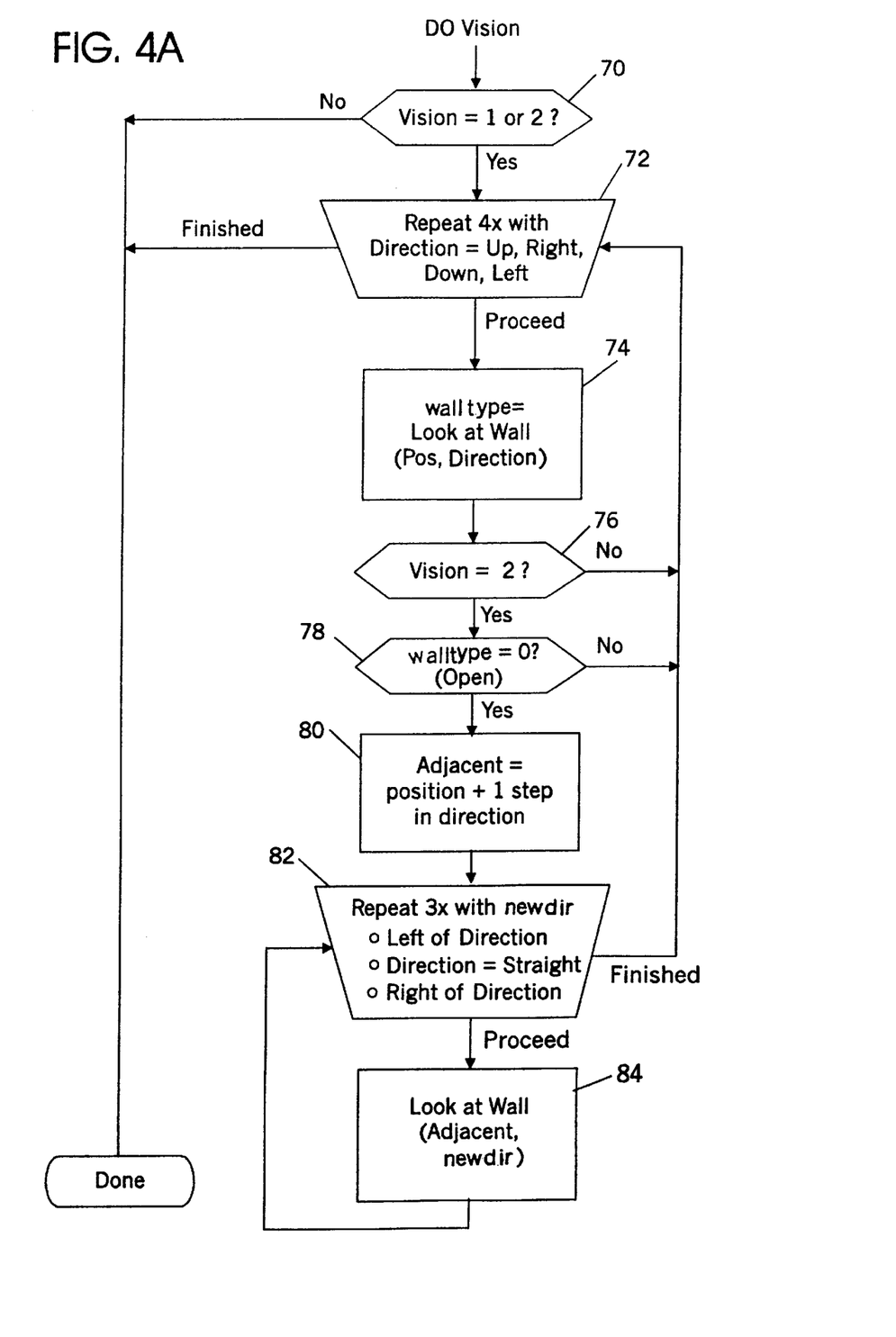
FIGS. 4A and 4B together represent a flow diagram illustrating vision settings of the invention.
Figure 4B:
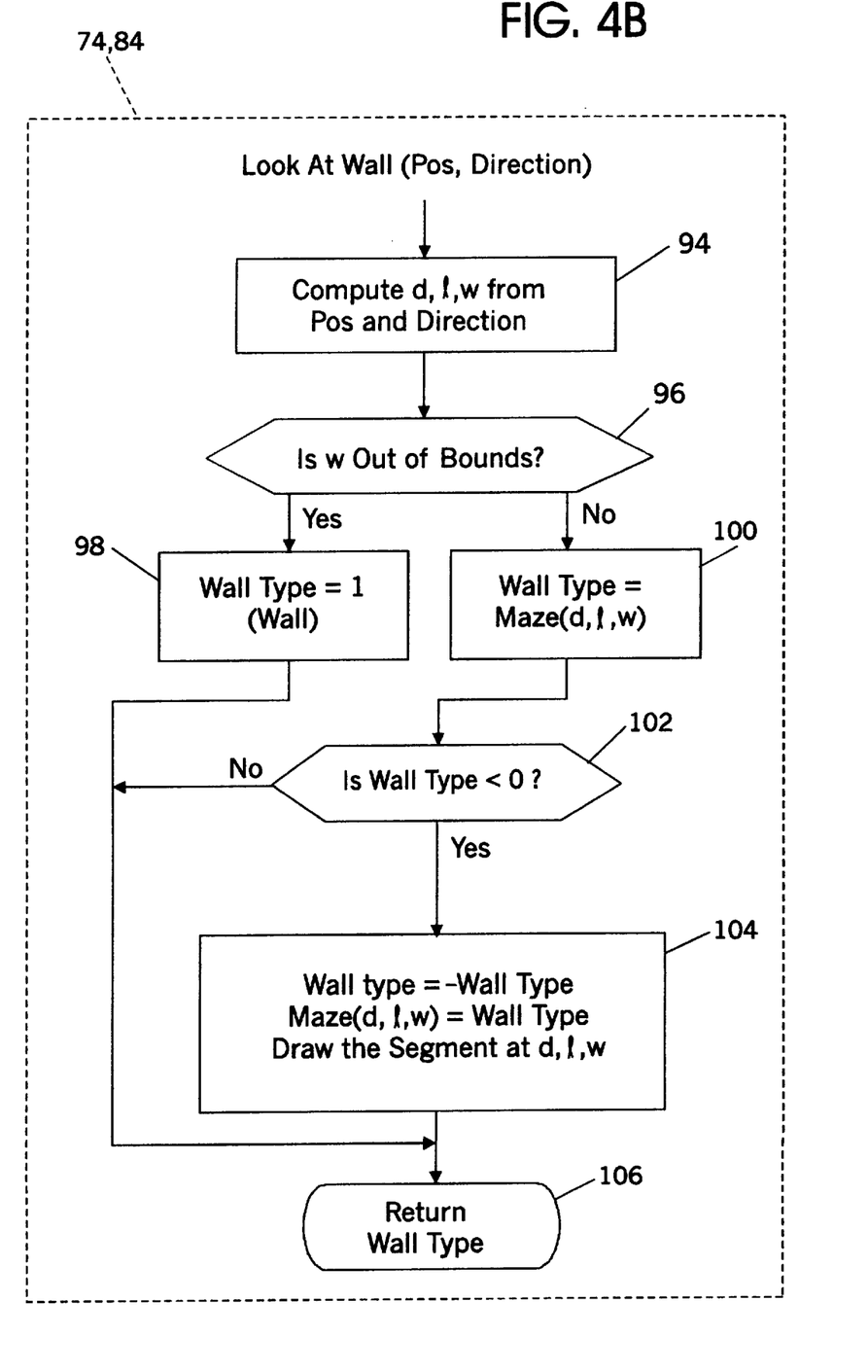

The flow chart illustrated in FIGS. 4A and 4B illustrates in more detail the operation of the vision method of the invention. Referring to FIG. 4A, the DoVision subroutine is entered at decision step 70. If the vision setting is not 1 or 2, then no further processing is required. (In setting 3 the work is already done; setting 0 operates during the movement phase itself: as the movement method looks at a segment to see whether the player can pass or is blocked, it makes the segment visible in the process.) If the vision setting is 1 or 2, the system moves to step 72. Step 72 specifies a loop: the subsequent steps (as indicated by the arrow labeled "proceed") will take place four times, with the direction variable taking a different value each time. On the first pass it will be up, on the second pass it will be right, then down, then left; after that the loop exits by the arrow labeled "finished." Thus, the method of the invention "looks" in each of the four directions in turn. Step 74 refers to a subroutine, LookAtWall, illustrated in detail in FIG. 4B. Its function is to take a position and a direction of view from that position, determine what segment borders that space in that direction, and determine what wall type is at that segment. If that wall type turns out to be an invisible feature, LookAtWall makes it visible in the process.

Referring to FIG. 4A, in step 76, if vision setting is not 2, then there is no need to look beyond the immediately adjacent segment; so the process loops back to 72, ready to look in the next direction. If, however, the vision setting is 2, then in step 78 the system determines if walltype=0, i.e., if the adjacent segment found in step 74 is an open passage. If not, the player can not see through it, so there is no further looking to do in this direction. If the wall type is open, then the player is able to see segments bordering the adjacent position, through the opening. In step 80, the program creates another position, named adjacent, one space away from the player in the current direction. This will be the "base of the operation" for the next 2 steps. Step 82 specifies a loop in a manner similar to step 72. But this time it looks in three directions relative to the primary working direction, namely, direction. Relative to direction the process looks left, straight, and right; newdir takes on one of these values in each of the three passes through the loop. There is no need to look back (the fourth direction) because that segment has already been processed in step 74. This loop, which repeats three times, is embedded in loop 72, which repeats four times, so its inner operation, LookAtWall step 84, as illustrated in FIG. 4B, may take place as many as 12 times during the whole DoVision process.

Referring again to FIG. 4A, step 84 executes the LookAtWall subroutine as discussed for step 74 above, to examine and possibly reveal one segment. But this time, although LookAtWall subroutine of step 84 returns a segment type, the vision method does not need it for any further processing. It suffices that the segment has become visible.

Returning to our example of FIG. 3B, segment c is "seen" from space P1 as open, thus when direction is right, step 80 takes place and sets the variable adjacent to refer to space P4. Looking left, straight, and right relative to direction, loop 82 sets newdir to up, right, and down, in turn, revealing wall h and teleport i (and examining open segment j without action) in the process.

FIG. 4B shows the LookAtWall subroutine, referred to in steps 74 and 84, in detail. Step 94 determines the wall location [d, l, w] being viewed by the player from the player's position. In the next decision step 96, the program determines if the wall location [d, l, w] is an exterior wall. If so, then in step 98 it sets walltype=1, indicating a solid wall, already visible. Note that the d, l, w, combination for an exterior wall is not a valid set of indices into the Maze array, so this special handling is required.

If, however, in step 96 it is determined that location [d, l, w] is not an exterior wall, then the element Maze [d, l, w] is retrieved in step 100 from the Maze array developed during the building of the maze as described above and as illustrated in FIG. 1. In step 102, the invention checks to see if the segment is already visible; if not, step 104 marks it visible (walltype=−walltype), and draws it. Note that if walltype is 0 (an open passage) its state does not change, nor does its appearance, because in the case of an open passage there is nothing to draw. In step 106 LookAtWall returns control to the main DoVision algorithm, returning the value of walltype, namely what type of segment was seen.

A natural extension of this vision scheme provides a radius of vision, r, measured in spaces. Any segment that borders a space that is within r steps away from the player is seen, provided that there is a line of sight from the center of the player's space to some part of that segment, unobstructed by any wall or other feature. (Vision setting 2 is equivalent to r=1 in this scheme.)

Figure 7:
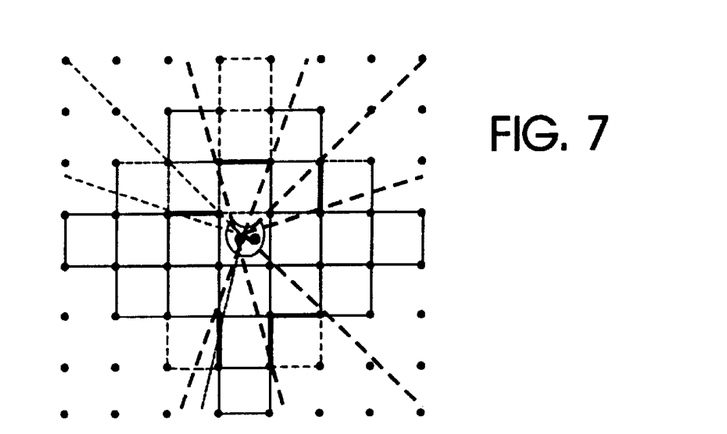
FIG. 7 illustrates a vision setting having a radius of vision r, measured in spaces.

FIG. 7 illustrates this vision scheme with r=3. The player is at the center. Heavy lines indicate walls. Light lines are segments that would be seen if they were walls; dotted lines are segments that would not be seen because they are obstructed by the walls. Segments left blank cannot be seen because they are outside the radius of 3 steps. Diagonal dashed lines are lines of sight, they show the limits of sectors of view that are obstructed by the various walls.

Figure 5A:
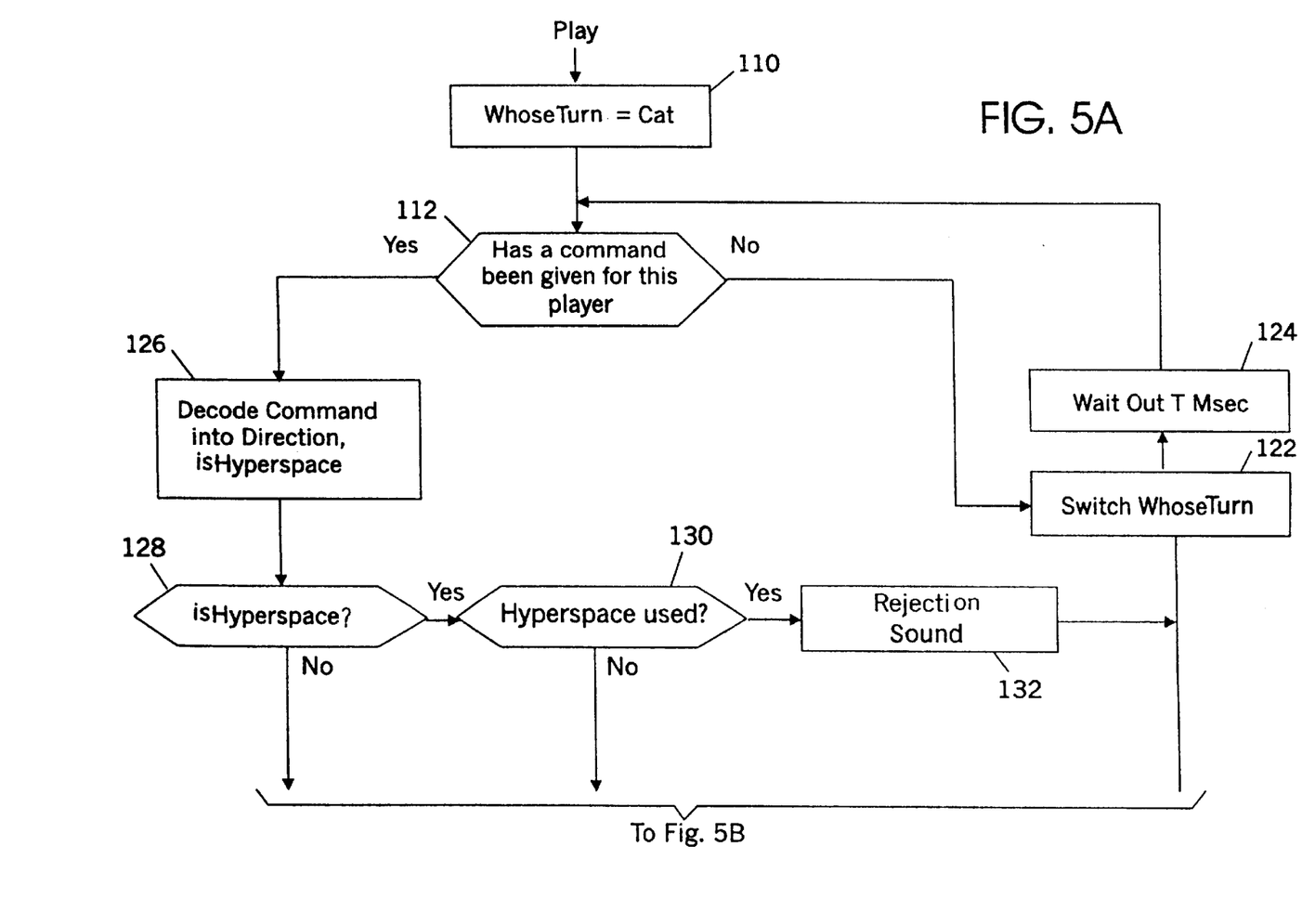
FIGS. 5A, 5B, and 5C together represent a flow diagram illustrating the overall playing process of the game.
Figure 5B:
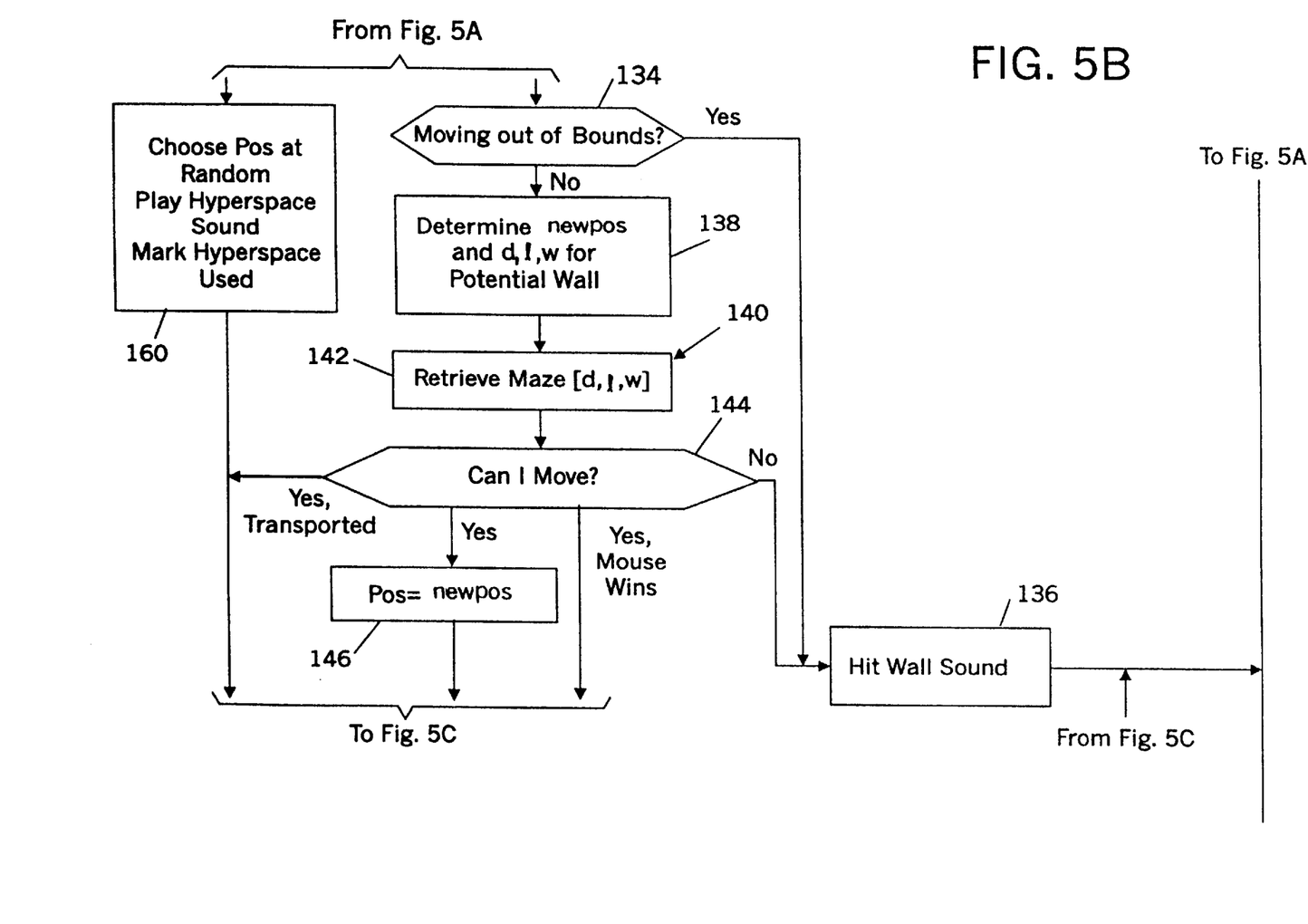
Figure 5C:
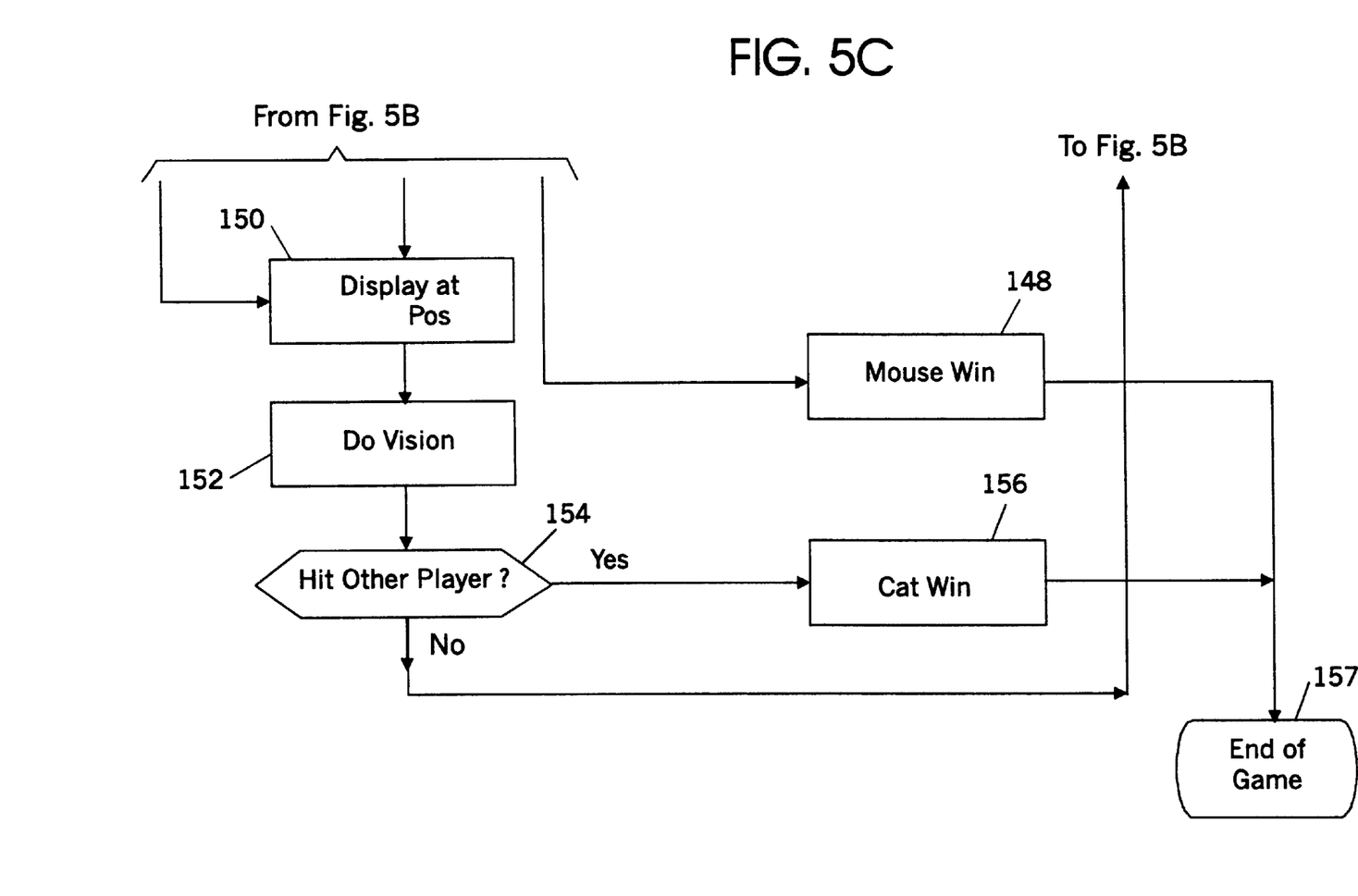

FIGS. 5A, 5B, and 5C together are a flow diagram showing the basic game loop of the invention. Although play is so fast that the players seldom perceive that they are taking turns, in the inner workings of the invention they do in fact take turns. The invention takes a movement command from one player, then the other; the variable whoseTurn indicates which is the current player. Each turn is always given a minimum length of T milliseconds. T is selectable by the players, and governs the perceived speed of the game.

The present embodiment of the invention uses a single keyboard for controls. Keys on the left side control the Cat, keys on the right side control the Mouse. It is understood, of course, that the cat and mouse could be replaced by a wide variety of other characters that can generally be referred to as the "hunter" and the "hunted," respectively. The mousehole, likewise, can be more generally viewed as a "refuge." Other control methods are also foreseen, including control by two joysticks, or control by two separate keyboards on separate computers, linked by a network. The choice of control method is not important to the nature of this invention.

Whatever control method is used, it provides five commands for each player: Up, Down, Left, Right, and Hyperspace. Hyperspace, which works only once per player per game, transports the player to an entirely new, random location. It is useful for getting out of trapped positions, which are sometimes created during the random creation of the maze.

Referring to FIG. 5A, the game begins with the cat's turn in step 110. Step 112 begins the main game loop, executed once for each turn of each player. Here the system of the invention determines if this player has actually given a movement command. If not, this player's turn ends, and control passes to the end-of-turn logic at step 122. This step switches whoseTurn to the other player; step 124 waits long enough to give the turn its appropriate period of time.

If the player has given a movement command, control passes to step 126 where the control logic (whose precise nature depends on the input devices being used) then decodes the player's keystroke into the direction, isHyperspace pair as discussed above. If the hyperspace command was given (128), step 130 determines if that particular player has already used hyperspace during the game. If so, then there is a hyperspace rejection sound at step 132, and that player's turn is over. However, if hyperspace has not been used, the system jumps the player to a random space in the maze to the announcement of a hyperspace sound in step 160 as shown in FIG. 5B. Control then passes to the normal actions following a move, at step 150 as shown in FIG. 5C.

However, if the command is an ordinary directional movement command, the invention tries to move the player one space in that direction. Referring again to FIG. 5B, step 134 checks for a move out of bounds; this is treated just like a collision with a solid wall. If so, the program produces a hit-wall sound in 136 and it becomes the other player's turn as shown in step 122 (FIG. 5A). Step 138 is the basic maze coordinate translation: given the player's position pos (in X, Y coordinates) and the direction of movement, it determines maze coordinates [d, l, w] for the segment that might obstruct the move. It also determines newpos, the position the player will have if the move succeeds. Given d, l, w, the segment type is retrieved in step 140. Step 142 retrieves the segment from the maze array; step 144 represents the detailed case-by-case logic that determines, based on the segment type, whether the move can actually take place. It is illustrated in detail in FIGS. 6A and 6B, and it has four possible outcomes:

1. No, the move is obstructed. The system plays a collision sound (step 136) and the turn is over.

2. Yes, and the mouse wins. This was a move that moved the mouse into the mousehole. End-of-game actions are taken, with much fanfare, at step 148. (FIG. 5C)

3. Yes, the move may proceed as normal. The new position newpos computed in step 138 becomes the player's position in step 146.

4. Yes, but the player has been transported. His position will not be newpos, but has been specially computed as a part of step 144. This is the case when the player meets a teleport or a randomizer.

If the outcome is No, then a "hit-wall sound" is played in step 136 and the turn ends. If the player can move to the next adjacent position as intended, the new position of the player is entered and then displayed on the maze in steps 146 and 150 (FIG. 5C). In case of the special result "Yes, transported," step 146 is skipped because the player will not arrive at the predicted position. The position pos has already been changed to give the correct new position. The next sequence of events (summarized in FIG. 5C as step 152) is the operation of the particular vision setting pre-selected by the players and has already been discussed above in reference to FIGS. 4A and 4B. Finally, step 154 determines if the cat and the mouse have arrived at the same space; if so, the cat wins in step 156. Otherwise, the system switches to the next player's turn as indicated in 128. After a win by either player, step 157 concludes with scorekeeping and other clean-up actions.

Figure 6A:
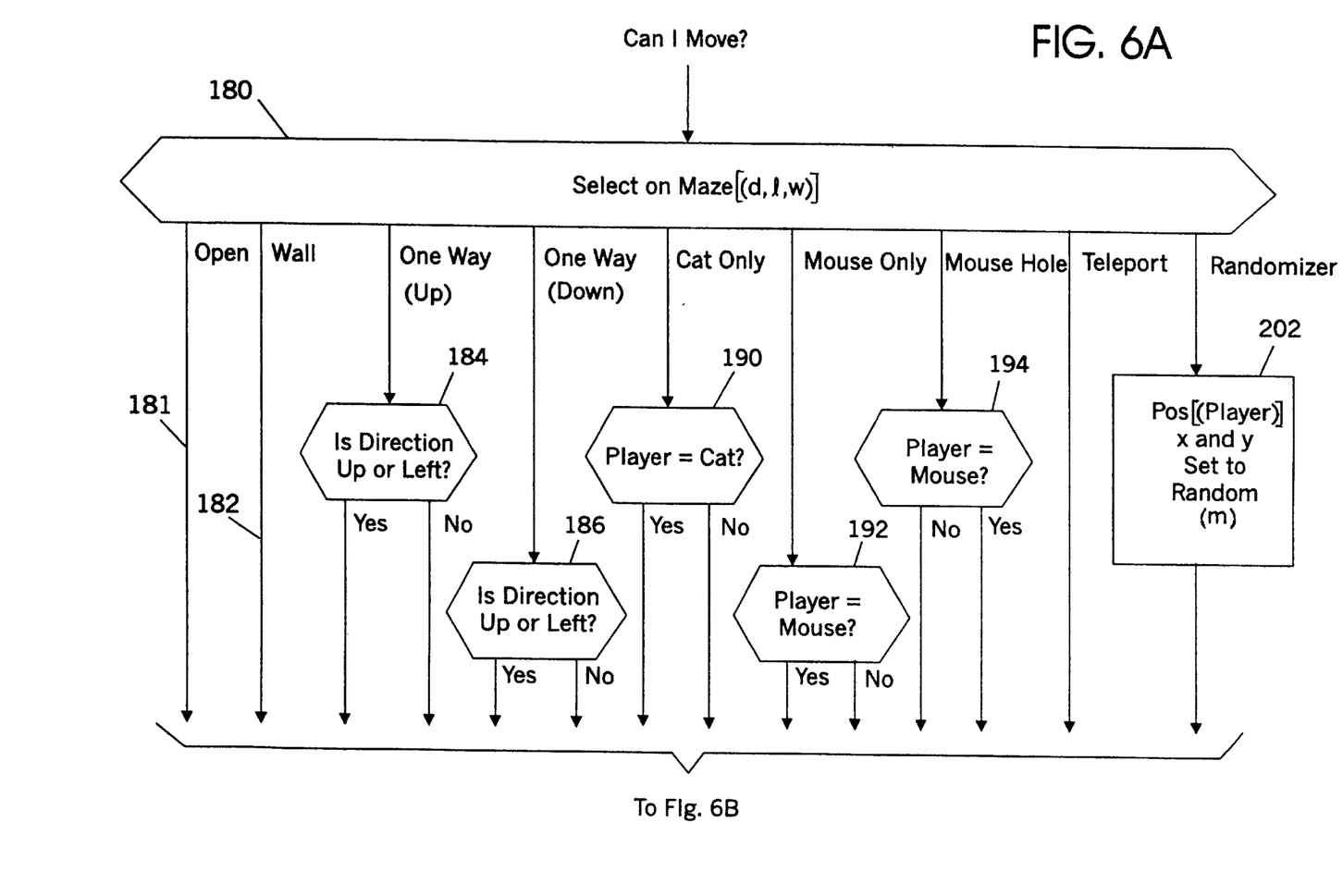
FIGS. 6A and 6B together represent a flow diagram illustrating the decision process as a player, attempting to move in a particular direction and encountering any one of the maze segment types, is allowed or forbidden to move.
Figure 6B:
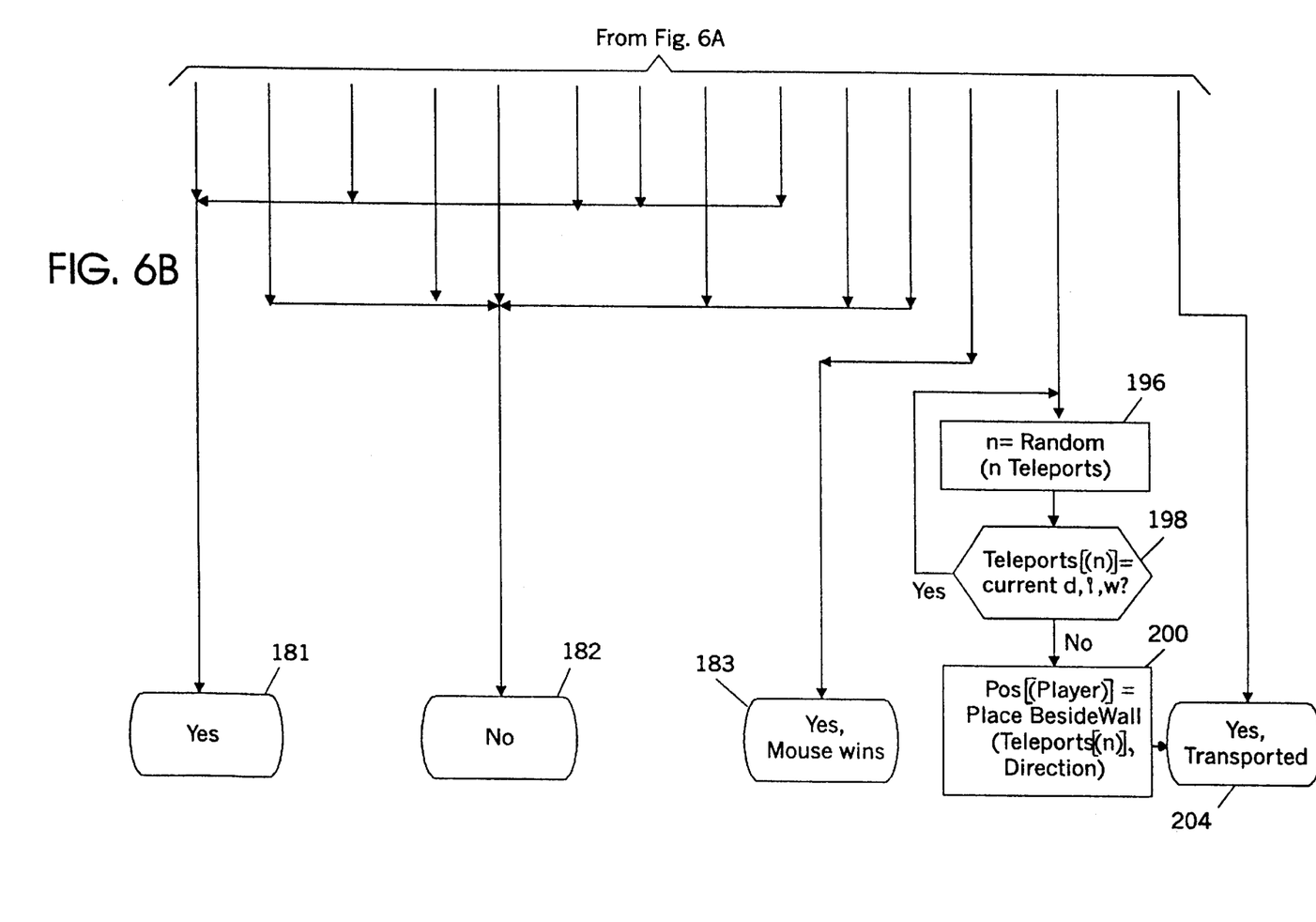

We now refer to FIGS. 6A and 6B, where the Can I Move subroutine is shown in detail. This is where each segment type acts according to its specific nature. So at the outset, at step 180, the program of the invention selects one of nine courses of action, based on the type of the segment (located at [d, l, w]) that the player has encountered as the player moves. Most of these types are fairly self-evident; they simply choose between Yes (the move can proceed), 181, and No (the move is blocked), 182. Thus an open segment always yields Yes, a solid wall always yields No, a one-way yields Yes only if the move is in the allowed direction (184, 186), and a Cat-only passage yields Yes only if the Cat is doing the moving, and No otherwise, 190. A mouse-only passage does the opposite, 192. Note that "One way up," 184, actually refers to an upward move or a leftward move, depending on the d coordinate for that segment. "One way down," 186, likewise permits downward or rightward moves.

The mousehole portion 194 of the Can I Move subroutine provides that when the Mouse moves across the mousehole segment, he escapes into the mousehole 183 and vanishes from the board, thereby winning the game. But to the Cat, the mousehole acts as a solid wall.

The teleport and randomizer types in steps 196 through 202 do not merely allow the player to move to the adjacent space, but transport him elsewhere. In the case of a randomizer, the player is re-materialized at a random space on the board, as indicated in step 202. (FIG. 6A)

Referring to FIG. 6B, if the segment is a teleport, a second teleport station from the teleport list is randomly selected as a destination, at step 196. Step 198 guards against choosing a destination equal to the sending station (a boring outcome); in this case, the invention will go back and choose another station at random. Once an acceptable destination has been selected, the player is transported to one of the two spaces bordered by the destination teleport segment, as indicated by step 200. In either of these cases, in step 204 the subroutine yields the special result "Yes, transported" which alerts the rest of the program to the fact that a new position has been computed.

While the invention has been described with reference to specific embodiments thereof, it will be appreciated that numerous variations, modifications, and embodiments are possible, and accordingly, all such variations, modifications, and embodiments are to be regarded within the spirit and scope of the invention.

What is claimed is:

1. A maze game method comprising the steps of:
   a) generating a maze comprised of a plurality of spaces each said space being defined by two opposed vertical and two opposed horizontal segments;
   b) causing each of said vertical and horizontal segments of said maze to be an open or solid wall;
   c) generating representations of at least two players and positioning said players in different said spaces at the start of said maze game;
   d) making said walls invisible to said players at the start of said maze game;
   e) moving said players through said maze; and
   f) making visible to each said player at least one of said invisible walls located immediately adjacent the space into which one of said players moves in response to said player moving into said space.

2. The method of claim 1, further comprising the step of having one of said players chase another one of said players through said maze.

3. The method of claim 1 further comprising the step of making visible to each of said players, in response to one of said players moving into a first space, said invisible walls bordering each space adjacent to said first space and with a clear line of sight from said first space to said invisible walls.

4. The method of claim 1, further comprising the step of making visible to each of said players, in response to one of said players moving into a first space, at least one of said invisible walls out to a specified radius from said first space, where there is a clear line of sight from the center of said first space to all or some portion of each of said invisible walls that becomes visible.

5. The method of claim 1 further comprising the step of allowing said players to pass through certain of said segments in one direction only.

6. The method of claim 1, further comprising the step of allowing only one of said players to pass through certain of said segments.

7. The method of claim 1, further comprising the step of causing at least two of said segments to be teleports, wherein said players are allowed to be transported from a first of said teleports to a second of said teleports.

8. The method of claim 1, further comprising the step of causing some segments to be randomizers, wherein a player passing through a randomizer is transported to a new, randomly selected space.

9. The method of claim 1, further comprising the step of representing at least one of said players as being the hunted.

10. The method of claim 9, further comprising the step of representing one of said players as a hunter of said hunted.

11. The method of claim 10, further comprising the step of designating one of said segments to be a refuge.

12. The method of claim 11, wherein the object of the game for said hunted is to enter said refuge before said hunter lands on said hunted.

13. The method of claim 12, wherein the object of said game for said hunter is to land on said hunted before said hunted enters said refuge.

14. An electronic maze game comprising:
a) an initially invisible maze having a plurality of initially invisible open and solid walls defining a plurality of spaces;
b) means for displaying at least two players;
c) means for positioning said players in said initially invisible maze;
d) means for moving said players through said spaces of said maze; and
e) means for making visible to each said player at least one of said invisible walls located immediately adjacent the space into which a said player moves in response to the said player moving into said space.

15. The electronic maze game of claim 14, further comprising means of making visible to each of said players said invisible walls located immediately adjacent the space into which one of said players moves in response to that said player moving into said space.

16. The electronic maze game of claim 14 further comprising means for making visible to each of said players, in response to one of said players moving into a first space, said invisible walls bordering each space adjacent to said first space and with a clear line of sight from said first space to said invisible walls.

17. The electronic maze game of claim 14, further comprising means for making visible to each of said players, in response to one of said players moving into a first space, at least one of said invisible walls out to a specified radius from said first space, where there is a clear line of sight from the center of said first space to all or some portion of each of said invisible walls that becomes visible.

18. The electronic maze game of claim 14, further comprising means for making visible to each of said players in response to one of said players moving into a first space said invisible walls bordering spaces in the line of sight from the center of said first space.

19. A maze game method comprising the steps of:
a) generating a maze comprised of a plurality of open and solid walls defining a plurality of spaces
b) displaying representations of at least two players and positioning said players in different said spaces at the start of said maze game;
c) making said walls invisible to said players at the start of said maze game;
d) moving said players through said maze; and
e) making visible to each said player at least one of said invisible walls located immediately adjacent the space into which one of said players moves in response to said player moving into said space.

20. The method of claim 19, further comprising the step of having one of said players chase another one of said players through said maze.

21. The method of claim 19, further comprising the step of making visible to each said player said invisible walls located immediately adjacent the space into which one of said players moves in response to that said players moving into said space.

22. The method of claim 19 further comprising the step of making visible to each of said players, in response to one of said players moving into a first space, said invisible walls bordering each space adjacent to said first space and with a clear line of sight from said first space to said invisible walls.

23. The method of claim 19, further comprising the step of making visible to each of said players, in response to one of said players moving into a first space, at least one of said invisible walls out to a specified radius from said first space, where there is a clear line of sight from the center of said first space to all or some portion of each of said invisible walls that becomes visible.

24. The method of claim 19 further comprising the step of allowing said players to pass through certain of said walls in one direction only.

25. The method of claim 19, further comprising the step of allowing only one of said players to pass through certain of said walls.

26. The method of claim 19, further comprising the step of causing at least two of said walls to be teleports, wherein said players are allowed to be transported from a first of said teleports to a second of said teleports.

27. The method of claim 19, further comprising the step of representing one of said players as a hunted.

28. The method of claim 27, further comprising the step of representing one of said players as a hunter.

29. The method of claim 28, further comprising the step of designating one of said walls to be a refuge.

30. The method of claim 29, wherein the object of the game for said hunted is to enter said refuge before said hunter lands on said hunted.

31. The method of claim 29, wherein the object of said game for said hunter is to land on said hunted before said hunted enters said refuge.

32. The method of claim 19, further comprising the step of defining said spaces by segments and causing some segments to be randomizers, wherein a player passing through a randomizer is transported to a new, randomly selected space.

* * * * *

UNITED STATES PATENT AND TRADEMARK OFFICE
CERTIFICATE OF CORRECTION

PATENT NO.     : 6,273,420 B1
DATED          : August 14, 2001
INVENTOR(S)    : Kenneth P. Brooks It is certified that error appears in the above-identified patent and that said Letters Patent is hereby corrected as shown below:

Column 2,
Line 35, "1=1" should read -- d=1 --.

Column 3,
Line 41, "<40," should read -- $\leq$40, --.
Line 42, "$\leq$32," should read -- $\leq$32, --.

Line 43, "$\leqq$4" should read -- $\leq$4 --.

Signed and Sealed this

Ninth Day of April, 2002

Attest:

JAMES E. ROGAN
*Attesting Officer*  *Director of the United States Patent and Trademark Office*